US005904225A

United States Patent [19]

Patros

[11] Patent Number: 5,904,225

[45] Date of Patent: May 18, 1999

[54] EXTENDEABLE SAWHORSE TOP RAIL

[76] Inventor: George Patros, 645 N.E. Fairmont St., Fridley, Minn. 55432

[21] Appl. No.: 08/958,421

[22] Filed: Oct. 27, 1997

[51] Int. Cl.[6] .......... F16M 11/00

[52] U.S. Cl. .......... 182/181.1; 182/183.1

[58] Field of Search .......... 182/181.1, 183.1, 182/224, 129

[56] References Cited

U.S. PATENT DOCUMENTS

| | | |
|---|---|---|
| 79,079 | 6/1868 | Pierce-Glimsdale . |
| 89,306 | 4/1869 | Goodher . |
| 970,508 | 9/1910 | Kamrath . |
| 1,580,935 | 4/1926 | Vidon . |
| 1,583,652 | 5/1926 | Brooks . |
| 1,841,676 | 1/1932 | Roberts . |
| 2,431,898 | 12/1947 | Witken . |
| 4,804,064 | 2/1989 | Coultrup et al. . |
| 5,236,166 | 8/1993 | Darling . |
| 5,402,860 | 4/1995 | Fry . |
| 5,526,897 | 6/1996 | Schiller . |

*Primary Examiner*—Alvin Chin-Shue
*Attorney, Agent, or Firm*—Nikolai, Mersereau & Dietz, P.A.

[57] ABSTRACT

A sawhorse extender attachment adapted to be affixed to the cross beam member of a conventional sawhorse that allows the effective length of the sawhorse to be adjusted. The attachment device comprises at least one containment base member having a groove extending the full length thereof along with a pair of extension members of a trapezoidal cross-section adapted to slidingly fit within the longitudinal groove in the base member. The extension members can be extended and retracted relative to the length of the base member and locked in place at predetermined locations along the length of the elongated containment groove. Provision is made for removable pegs to be placed into the extension members where the pegs project above the top surface thereof for inhibiting lateral shifting of any work piece resting on the sawhorse extender.

8 Claims, 2 Drawing Sheets

EXTENDEABLE SAWHORSE TOP RAIL

BACKGROUND OF THE INVENTION

I. Field of the Invention

This invention relates generally to sawhorses used in supporting work pieces at a convenient height as work is being performed on the work pieces, and more particularly to an attachment for such sawhorses for providing axial extension of the work surface for firm support of work pieces of varying size and shapes.

II. Discussion of the Prior Art

Conventional, prior art sawhorses generally comprise first and second pairs of legs that are joined together by an elongated cross beam where the legs of each pair come together at an acute angle at the point where they join to the cross beam. Such devices have been used for centuries by carpenters and other workmen for supporting work pieces, such as lumber, panels, pipes, etc., at a convenient height so that the workmen can stand while performing operations on the object in question.

Sawhorses whose length and height dimensions can be adjusted to accommodate differing sizes and shapes of work pieces are known in the art. Exemplary of such sawhorses of adjustable size and height are described in the following U.S. Patents:

Fry—U.S. Pat. No. 5,402,860

Coultrup et al.—U.S. Pat. No. 4,804,064

Witken—U.S. Pat. No. 2,431,898

Vidon—U.S. Pat. No. 1,580,935

Kamrath—U.S. Pat. No. 970,508

Goodher—U.S. Pat. No. 89,306

In each of the above exemplary prior art adjustable length sawhorses, it is the cross beam of the sawhorse itself that is designed to be telescopingly extended and collapsed in adjustment of the overall length dimension thereof.

Many sawhorses are now in use that have a solid, non-extendable cross beam member. Such sawhorses are commonly about 36 inches in length and made from wood or metal and generally have foldable legs so that they can be collapsed and more readily transported between job sites. When working on larger panels, such as 4'×8' sheets of plywood doors, window or the like, it is somewhat difficult to stabilize the work piece against shifting when supported on two such non-extendable sawhorses. Thus, a need exists for an accessory device that may readily be attached to a standard, non-extendable sawhorse for permitting stable support for a variety of work pieces of differing sizes and shape configurations. It is the object of the present invention to fulfill this need.

SUMMARY OF THE INVENTION

The present invention involves a sawhorse extender that comprises a base member of a predetermined length, width and depth dimension that is adapted to be attached by bolts or otherwise to a cross member of a conventional sawhorse. The base member is of a generally rectangular cross section and it includes at least one, elongated, such as a dove-tail groove or containment groove or T-slot that extends the full length dimension of the base member. First and second extension members, each of a length that is approximately one-half of the predetermined length of the base member are provided and they have a cross sectional shape allowing them to be slidingly received in the containment groove in the base member. A spring-loaded latching pin cooperates with the base member and with the first and second extension members for positively locking the first and second extension members in place at predetermined locations along the length of the elongated containment groove.

Formed inwardly of the top surface of the first and second extension members is a cylindrical bore of a predetermined depth into which may be inserted a cylindrical peg assigned so that it projects above the top surface of the extension members. A work piece placed between the projecting cylindrical pegs serves to prevent shifting of the work piece relative to the sawhorse as manipulations are being performed on the work piece.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF A PREFERRED EMBODIMENT

Figure 1:
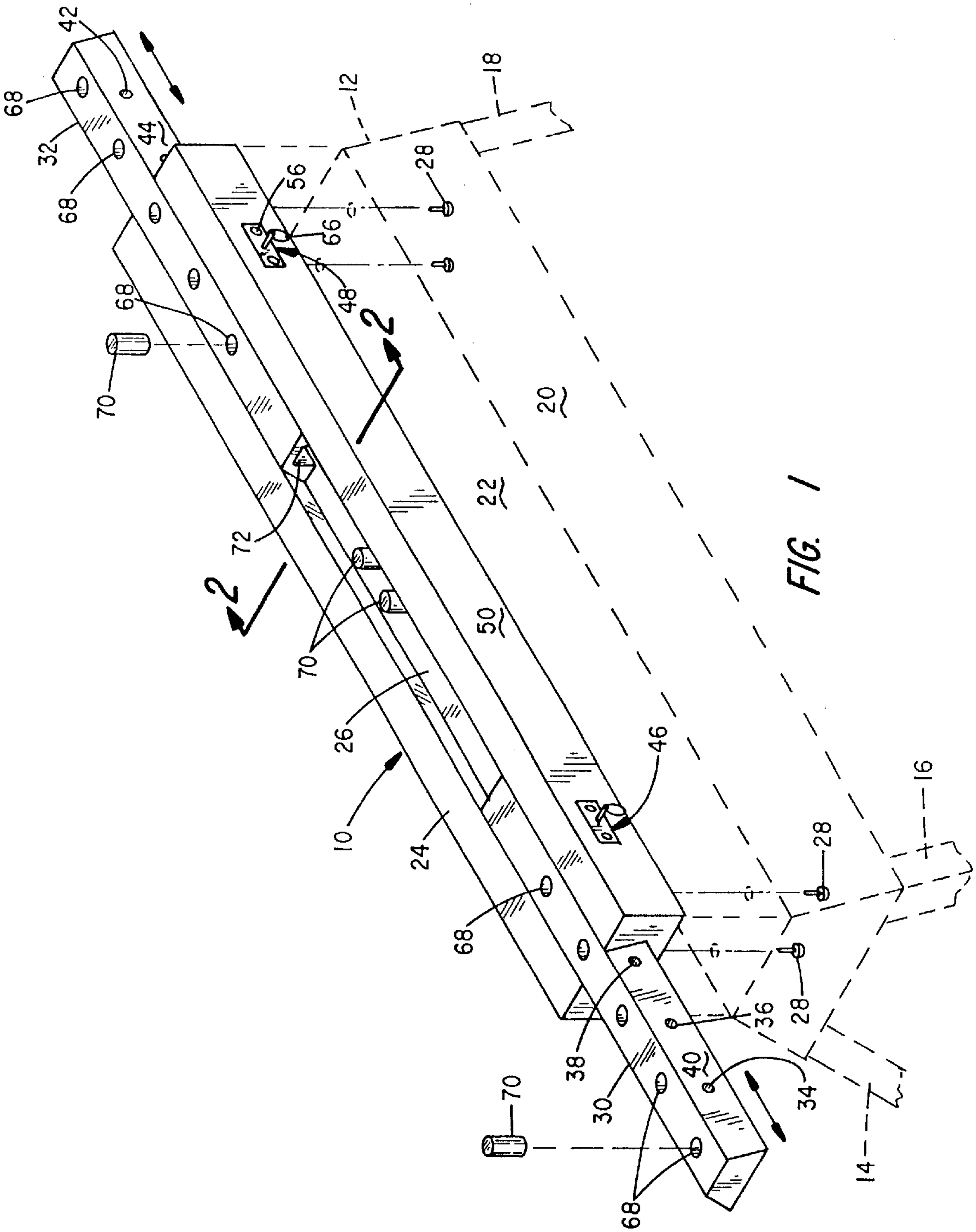
FIG. 1 is an exploded perspective view of the sawhorse extender attachment constructed in accordance with the present invention.

FIG. 1 illustrates by means of a perspective drawing a preferred embodiment of an extendable top rail attachment for a sawhorse. It is indicated generally by numeral 10, with an upper portion of a conventional sawhorse 12 being shown in phantom line. The sawhorse includes a pair of non-parallel legs 14–16 at one end thereof and corresponding legs at the opposite end thereof, of which only leg 18 is visible. Spanning the legs is a top rail member 20 having a generally horizontal, planar upper surface 22.

Figure 2:
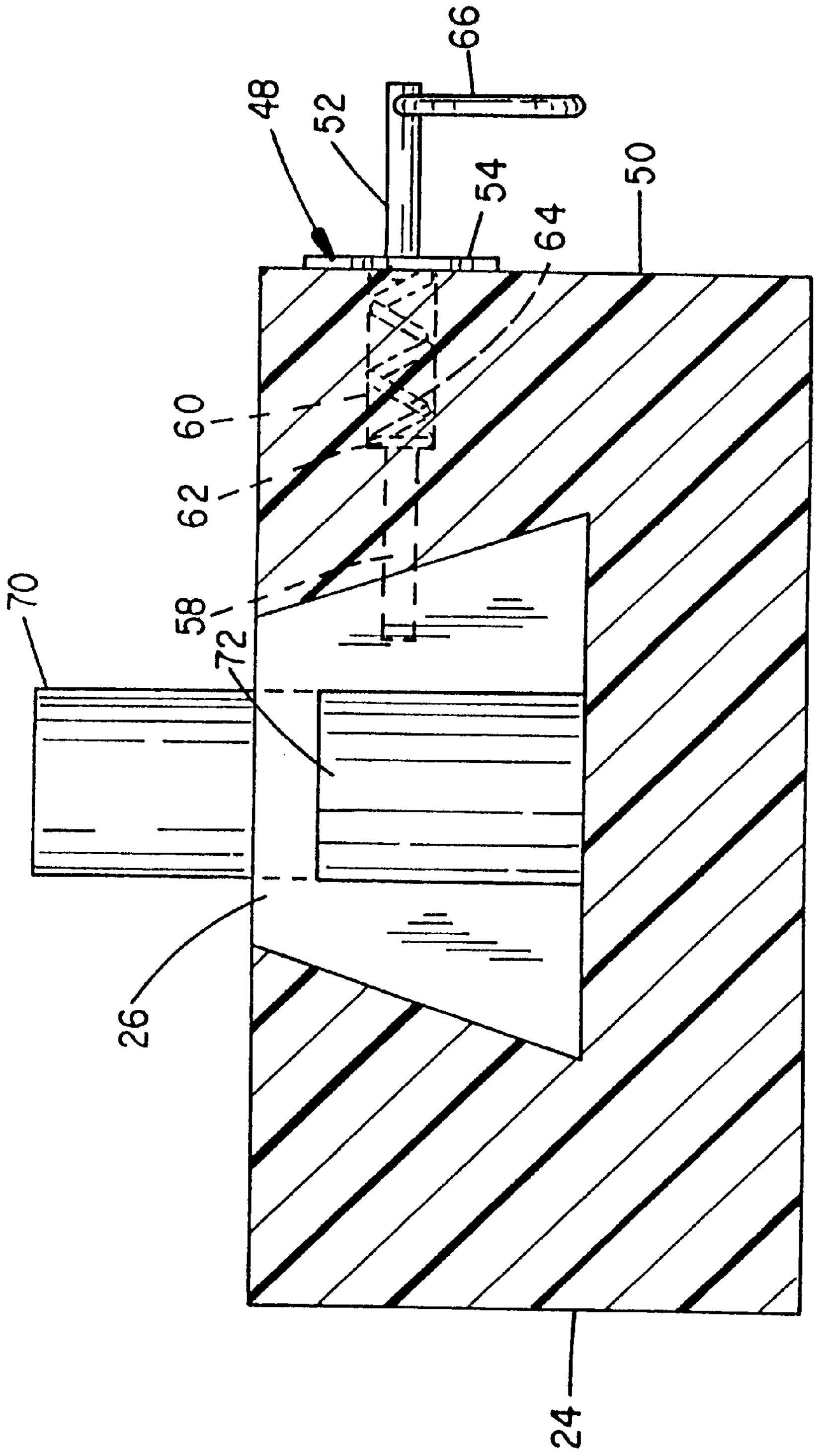
FIG. 2 is a cross-sectional view taken along the line 2—2 in FIG. 1.

The extendable top rail assembly 10 includes a base member 24 which, as seen in the cross-sectional view of FIG. 2, is generally rectangular in cross section and includes at least one elongated containment groove 26 running the full length thereof. The base member may be formed of wood, metal or a suitable plastic, such as polyurethane. The channel 26 is shown as being trapezoidal in shape to define a dove-tail groove with the base of the trapezoidal channel being wider than its top. The base member 24 of the sawhorse extender 10 is adapted to be bolted or otherwise affixed as by bolts 28 to the surface 22 of the top rail 20 of the sawhorse 12.

First and second extension members 30 and 32, each of a length that is about one-half of the length of the base member have a cross-sectional shape corresponding to the dove-tail groove 26 of the base member, thereby allowing the extension members 30 and 32 to be slidingly received in the dove-tail groove 26 of the base member 24.

Those skilled in the art can appreciate that the channel need not be trapezoidal in cross-section, but need only be of a cross-sectional shape so that the extension members can axially slide in the channel, but cannot be extracted from it except from its end.

As can be seen in FIG. 1, a series of cylindrical bores 34, 36, 38 are formed inwardly of a sloping side surface 40 on the extension member 30 and, likewise, similar bores, as at 42, are formed in the sloping side wall 44 of the extension member 32. These bores or apertures formed inwardly of the side walls 40 and 44 of the extension members 30 and 32 are adapted to cooperate with a spring-loaded locking pin assembly 46 and 48 mounted in the side wall 50 of the base member 24.

Referring again to FIG. 2, the spring-loaded locking pin assembly 48 is seen to include an elongated steel pin 52 that passes through an aperture in a mounting plate 54 that is attached to the wall 50 of the base member by screws, as at 56. Formed in the base member 24 beneath the mounting plate 54 is a horizontally extending bore 58 of a diameter slightly larger than the diameter of the pin 52 and a counterbore 60 of a somewhat larger diameter such that an annular flange 62 formed on the pin 52 can slide within the counterbore 60. The counterbore 60 also receives a compression spring 64 therein that cooperates with the annular flange 62 and mounting plate 54 to urge the pin 52 inwardly. A grasping ring 66 is affixed to the outer end of the pin 52 allowing the user to readily pull back on the pin against the force of the spring 64 so that the pin 52 is retracted fully from the dove-tail shaped containment groove 26, allowing the extension member 32 to freely slide with the dove-tail channel. When the degree of extension of the end of the extension member 32 beyond that of the base member 24 is arrived at, the user may release the grasping ring 66, allowing the pin 52 to press against the side wall 44 of the extension member. Then, by slightly moving the extension member in one direction or the other, the pin will fall into a selected one of the bores 42, etc. formed laterally in the sloping side wall 44 of the extension member 32. The spring-loaded locking pin assembly 46 cooperates with the extension member 30 in just the same fashion.

It has also been found convenient to provide a series of vertically directed cylindrical bores, as at 68, in the exposed top surfaces of the extension members 30 and 32. Cooperating with these bores are cylindrical pegs 70 which can be selectively positioned in any one of the bores 68 to function as an edge stop for a work piece (not shown) to prevent lateral shifting thereof as the workmen perform sawing, drilling or other operations on that work piece. An additional pair of cylindrical bores are formed in the base member 24 in the center of the dove-tail groove 26 for the purpose of storing pegs 70 when not in use. For this purpose, the inner ends of the extension members 30 and 32 have a recess as at 72 so that the ends of the extension members can be made to abut one another without interfering with the pegs 70 when in their storage position within the channel 26.

Strictly for the purpose of illustration and without any limitation intended, the base member 24 may be 36 inches in length, 2½ inches high and 4¾ inches wide. Its containment groove or channel 26 is preferably but now necessarily centered across the width dimension and designed to receive a correspondingly shaped extension member 30, 32. If the containment groove is trapezoidal as illustrated, the extension members may, for example, have a major base of 2½ inches in length and a minor base of 1½ inches. The extension members 30 and 32 may each be 18 inches in length and the stop holes 34, 36, etc. may be on 3 inch centers to allow for varying degrees of extension beyond the ends of the base member 24. The bores 68 for receiving the dowels or pegs 70 may be dimensioned to receive a ¾ inch diameter peg with low friction. Those bores may be on 3 inch centers and preferably positioned between the stop pin bores 34, 36, etc. formed in the extension members.

The present invention has been found to greatly facilitate working on items whose width dimension exceeds the width of a conventional sawhorse in that it becomes positively supported over its full width dimension and precluded from lateral movement by appropriate placement of the work piece dowels 70 following the setting and locking of the degree of extension of the extension members beyond the ends of the base member.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A sawhorse extender comprising, in combination:

(a) a base member of a predetermined length, width and depth dimension adapted to be attached to a cross member of a sawhorse, said base member being of generally rectangular cross section and including a planar top and at least one elongated containment groove extending said length dimension;

(b) first and second extension members of a cross-sectional shape allowing said first and second extension members to be insertable into the at least one containment groove in the base member only from an end thereof and slidingly received therein, each of the first and second extension members having a cylindrical bore of a predetermined depth formed in a top surface thereof and with a further bore formed in the base member at the bottom of the containment groove, said first and second extension members each including a recess formed inwardly from one end thereof;

(c) means cooperating with the base member and with the first and second extension members for locking the first and second extension members in place at predetermined locations along the length dimension of said at least one elongated containment groove; and (d) at least one cylindrical peg dimensioned to fit into the cylindrical bores formed in the top surfaces of the first and second extension members, the peg designed to extend above said top surface when inserted into the cylindrical bores formed therein, the at least one peg further dimensioned to fit within the further bore formed in the base member and within the recess formed inwardly from one end of one of the first and second extension members when the first and second extension members are fully contained within the at least one containment groove for storage when not in use.

2. The sawhorse extender as in claim 1 wherein the means for locking comprises a spring-loaded retractable pin extending through a side wall of the base member and adapted to engage one of a plurality of bores formed inwardly in a side wall at predetermined space locations along the lengths of the first and second extension members.

3. The sawhorse extender of claim 1 wherein the means for locking comprises a spring-loaded, retractable pin extending through a side wall and adapted to engage one of a plurality of bores formed inwardly in a side wall at predetermined spaced locations along the length of the first and second extension members.

4. The sawhorse extender of claim 3 wherein a plurality of said cylindrical bores of a predetermined depth are formed in the top surface of each of the first and second extension members midway between adjacent ones of said plurality of bores formed inwardly in the side walls of the first and second extension members.

5. The sawhorse extender of claim 1 wherein the first and second extension members have a trapezoidal cross-sectional shape.

6. The sawhorse extender of claim 1 wherein the base member and the first and second extension members are each formed from a polymeric material.

7. The sawhorse extender of claim 1 wherein the containment groove is shaped to prevent removal of said extension members therefrom except from an end of the base member.

8. The sawhorse extender of claim 7 wherein the containment groove and the extension members have a dove-tail cross-sectional shape.

* * * * *